United States Patent [19]

Inoue et al.

[11] 4,114,146

[45] Sep. 12, 1978

[54] ULTRASONIC WAVE WATCHING DEVICE OF MOVING OBJECT DETECTING TYPE

[75] Inventors: Hiromitsu Inoue, Kyoto; Hiroshi Ohashi; Susumu Katayama, both of Hirakata, all of Japan

[73] Assignee: Matsushita Electric Works, Ltd., Osaka, Japan

[21] Appl. No.: 719,159

[22] Filed: Aug. 31, 1976

[30] Foreign Application Priority Data

Sep. 13, 1975 [JP] Japan .............................. 50/111114
Sep. 13, 1975 [JP] Japan .............................. 50/111115
Dec. 15, 1975 [JP] Japan .............................. 50/149815
Feb. 28, 1976 [JP] Japan .............................. 51/21467

[51] Int. Cl.² .......................................... G08B 13/24
[52] U.S. Cl. ................................ 340/558; 343/5 PD
[58] Field of Search ................ 340/258 A; 343/5 PD

[56] References Cited

U.S. PATENT DOCUMENTS 3,942,178  3/1976  Hackett .......................... 340/258 A Primary Examiner—Glen R. Swann, III
Attorney, Agent, or Firm—Burns, Doane, Swecker & Mathis

[57] ABSTRACT

This invention provides an ultrasonic wave watching device for detecting a moving object wherein an ultrasonic wave signal generated by an oscillator is transmitted from a transmitter, reflected signals from a stationary object and moving object are received by a receiver and the variation with time of the phase difference between these received signals and the transmitted signal is detected to determine the presence and moving direction of the moving object.

5 Claims, 78 Drawing Figures

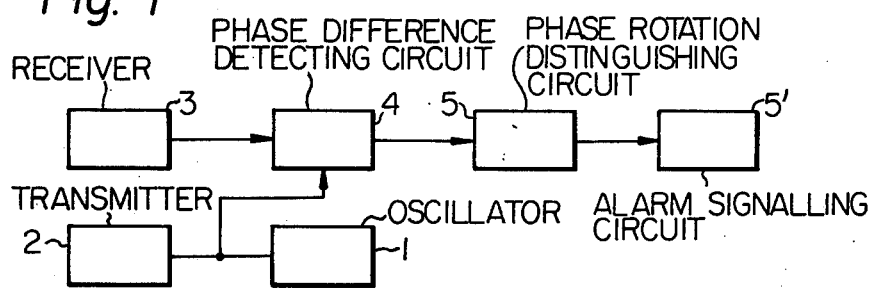
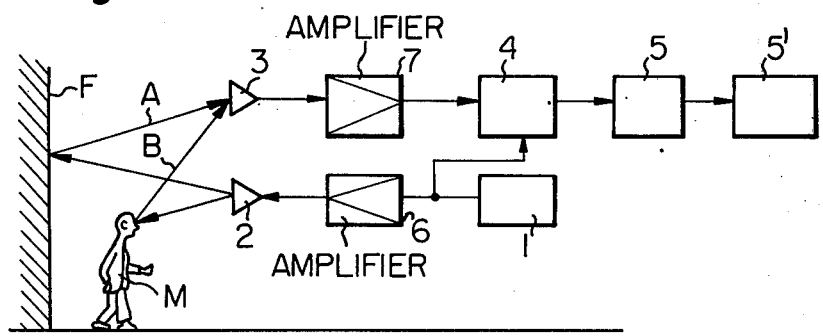
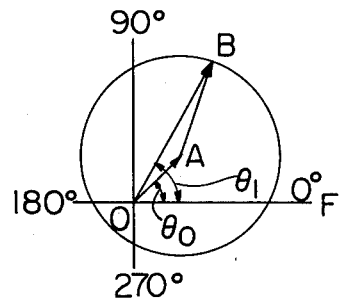

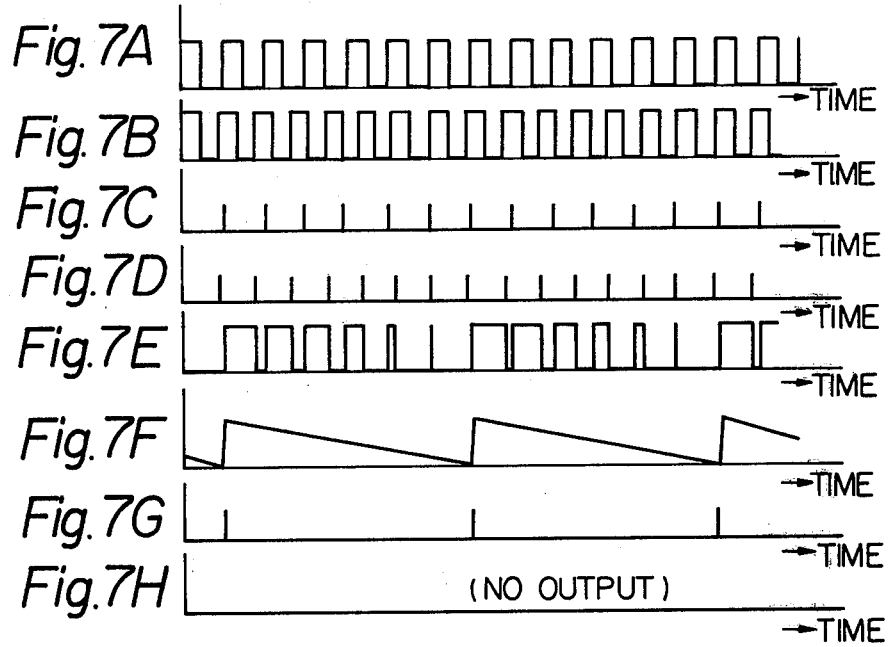
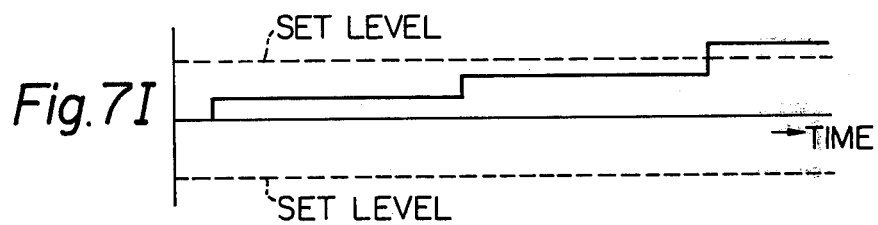

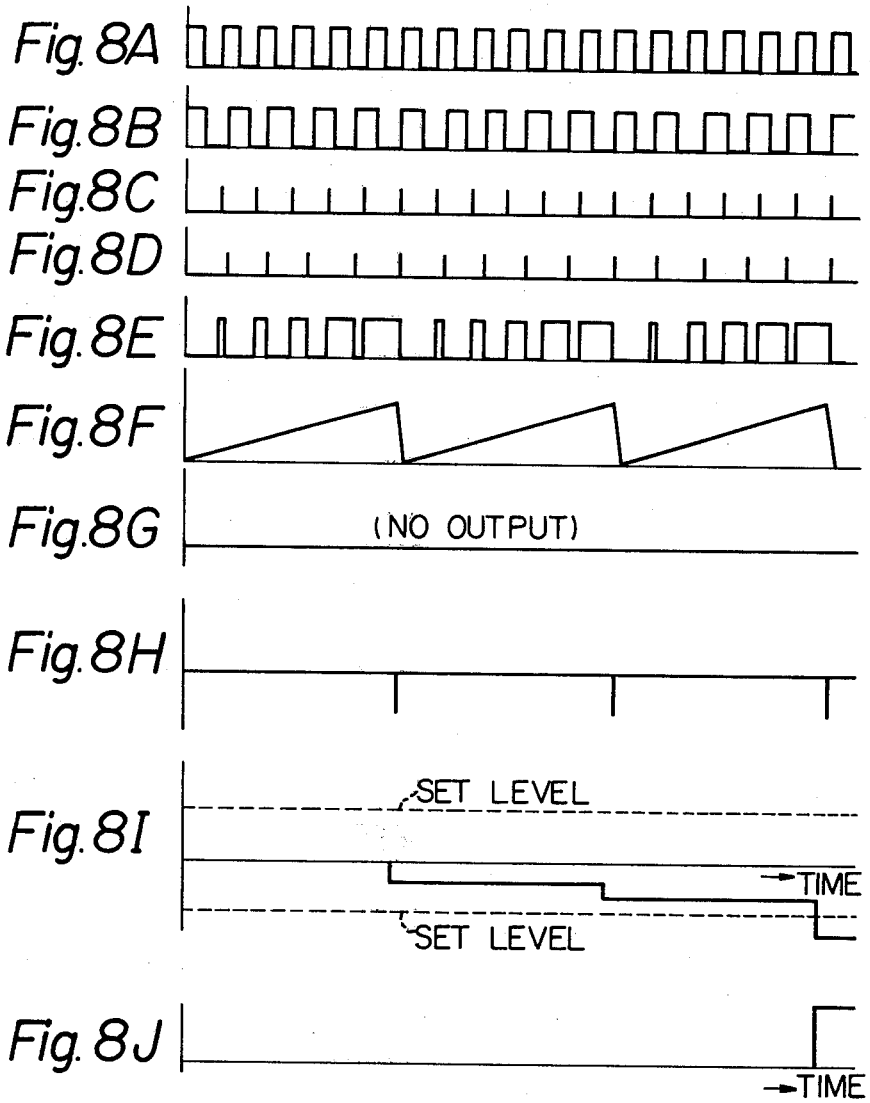

COURSE LENGTH VARIATION

COURSE LENGTH VARIATION

COURSE LENGTH VARIATION

COURSE LENGTH VARIATION

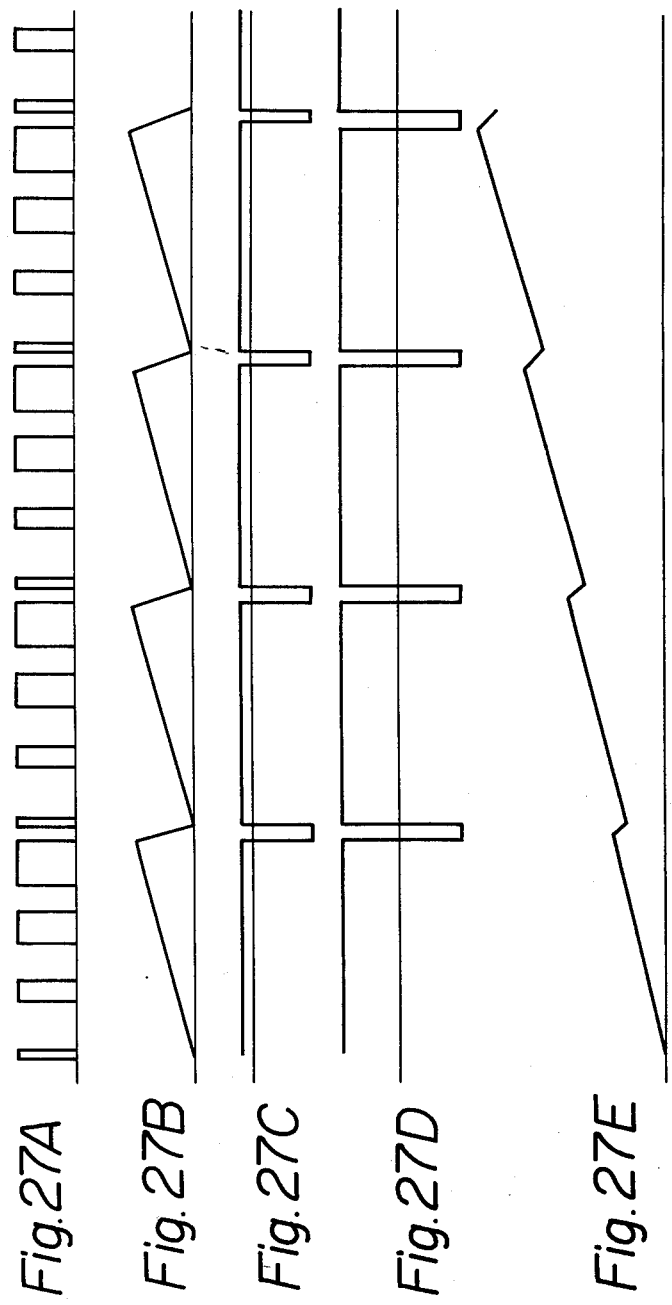

ULTRASONIC WAVE WATCHING DEVICE OF MOVING OBJECT DETECTING TYPE

BACKGROUND OF THE INVENTION

This invention relates to ultrasonic wave watching devices of moving object detecting type and, more particularly, to a moving object detecting type ultrasonic wave watching device wherein a reflected wave from a moving object in a watching space in which an ultrasonic wave is emitted is received by a receiver and this received signal is treated to detect the presence of a moving object and to operate switch device of an alarm.

The watching device of the kind referred to is to show a watching function to help the security of kept articles by generating a warning by quickly detecting any illegal intruder in such place wherein important articles are retained or kept as, for example, museums, art galleries, show rooms, safe chambers, jewellery stores or the like. The stability of its operation has been influenced by such conditions caused by the setting state or the environment of the setting place of the device as, for example, a reflected wave from a stationary fixed object, a foreign ultrasonic wave noise and the like.

Therefore, the greatest technical object of the device of this kind is to positively obtain only a wave component reflected from a moving object from a received signal including a reflected wave from a moving object, a reflected wave from a stationary or fixed object or objects such as room walls, displayed articles and the like in the watching space, a directly transmitted signal from a transmitter to a receiver and such foreign ultrasonic wave noise as, for example, a sound of a telephone bell, register, typewriter, key bundle or the like, irrespective of any alarm setting state and environment.

There has been already suggested such useful watching device as, for example, of the following type wherein a phenomenon (so-called "Doppler shift") that a frequency of ultransonic wave reflected from a moving object in the watching space shifts from the frequency of emitted ultrasonic wave signal because of the movement of the object is utilized to detect this shifting component to determine the presence of the moving object. In this device, a certain frequency band of such shifts produced, for example, in the case of the movement of a human body is determined in advance by an experiment or calculation and a signal from the moving object is detected by using a filter passing only this frequency band. According to this device, it is possible to positively distinguish or discriminate a reflected wave from a stationary object or a directly received wave from a transmitter to a receiver which does not show the Doppler shift from a reflected wave from a moving object which shows the Doppler shift. However, as the before described foreign ultrasonic wave noise or the frequency component generated by wind which is superposed on the shifting frequency is included in the preset frequency band, the device is still likely to cause a false alarm or indication of the presence of a moving object.

In another watching device suggested to avoid the above described defects, in treating a received signal, its signal component is separated simultaneously into components respectively higher and lower than the frequency $f_o$ of the transmitted signal, they are separately detected and, only in case one of these signals (higher or lower) alone is detected or one signal component is predominantly more than the other, a switch of the device will be actuated.

The treating method of this device is achieved on the basis of, first, the property that the Doppler shift generated by the movement of the object occurs only on one of the upper and lower sides with respect to the transmitted wave frequency to and, second, an assumption that the frequency distribution of the noise occurs generally as substantially uniformly balanced on both upper and lower sides with respect to the transmitted wave frequency $f_o$.

If this method is used, it is possible to eliminate far more influences of external turbulences than in the case of the first described device but no effect can be expected on noises having a spectrum generated asymmetrically above and below with respect to the transmitted wave frequency and still there has been a defect that a false alarm occurs with a part of foreign noises.

SUMMARY OF THE INVENTION

The present invention has been suggested to eliminate the above problems in such known devices and according to the present invention, the before described technical problems are successfully solved by detecting the presence and moving direction of a moving object by determining the state of the variation with time of the phase difference caused by a Doppler shift between an ultrasonic wave signal generated in an oscillator and a reflected and returned ultrasonic wave signal from the moving object.

More particularly, according to the present invention, the technical problems has been successfully solved in such that, noticing the fact that in case a moving object is present the phase angle of a received signal (a received ultrasonic wave as converted to an electric signal) for which the transmitted signal is used as a reference will continuously increase or decrease in one direction (which shall be referred to as a fixed directional phase rotation) due to the Doppler shift part contained in the received signal, the presence of the moving object is determined by detecting this fixed directional phase rotation so that the reflected wave from the moving object will be distinctly discriminated from such external turbulence as a foreign ultrasonic wave or wind occurring at random irrespective of the phase of the transmitted signal and showing no fixed directional phase rotation as well as the reflected wave from the stationary object and the directly received wave whose respective frequencies are the same as of the received signal and which therefore keep a substantially constant phase relation with the received signal and also does not show a fixed directional phase rotation and thereby the presence and moving direction of the moving object will be detected.

According to the present invention, further, it is attempted to prevent the operation of the device from becoming unstable due to any variations in the phase and magnitude of the received wave signal caused depending on the installation state of the device and, for this purpose, a correction circuit which is capable of adequately adjusting mutual relations in the phase and magnitude between the reference signal and the received wave signal is provided, whereby the before described technical problem is to be more completely solved.

A primary object of the present invention is to provide a watching device which operates positively without misoperating due to a foreign ultrasonic wave noise or any other interfering signals.

Another object of the present invention is to provide a watching device improved in the detecting capacity so that even a moving object which is more distant away from sensing transmitter and receiver and has a less amount of reflected waves can be detected by eliminating influences of stationary or fixed object and the like.

A further object of the present invention is to provide a watching device of which operation in a constant waiting state in the absence of any moving object to be detected can be kept stable.

BRIEF DESCRIPTION OF THE DRAWING

Another object of the present invention is to provide a watching device which will perform a positive switching operation when a moving object to be detected is present.

The present invention shall now be explained with reference to certain preferred embodiments of the invention shown in accompanying drawings, in which:

FIG. 1 is a block diagram of an embodiment of the present invention showing its basic arrangement;

FIG. 2 is a diagram for explaining the operation of the embodiment of FIG. 1;

FIG. 3 is a vector diagram of reflected waves from a stationary or fixed object and moving object;

FIGS. 5A through 5E are time charts of output voltages depending on the phase differences, in which FIGS. 5A to 5C are of different movements of the moving object and FIGS. 5D and 5E are of wind and foreign noise, respectively;

FIGS. 7A through 7J are time charts of output signals at the respective blocks in the embodiment of FIG. 6 in the case when a moving object approaches the watching device;

FIGS. 8A through 8J are time charts similar to FIGS. 7A to 7J but in the case when the object moves away from the device;

FIGS. 26A through 26E and 27A through 27E are respectively similar diagrams to FIG. 25 in the cases when the moving object approaches and moves away from the watching device.

DESCRIPTION OF THE PREFERRED EMBODIMENTS

Figure 4:
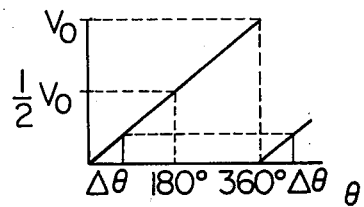
FIG. 4 is a diagram showing relations between phase differences of reflected waves from a moving object and their detected output voltages.

References shall be made first to the most basic arrangement of the watching device according to the present invention as shown in FIG. 1.

An output signal of an oscillator 1 is emitted as an ultrasonic wave into a watching space by a transmitter 2. Reflected waves from a stationary or fixed object which shall be referred to simply as stationary object hereinafter and a moving object present in the watching space are received by a receiver 3. The received signal is compared with the signal from the oscillator in the phase difference by a phase difference detecting circuit 4. Such fixed directional phase rotation as described in the foregoing caused by the moving object is detected by a phase rotation distinguishing circuit 5 and an alarm signalling circuit 5' is operated by an output from the phase rotation distinguishing circuit 5.

The phase difference detecting circuit 4 detects the phase of the output signal of the receiver 3 with respect to the oscillated output signal of the oscillator 1. Only when this phase increases or decreases always in one direction, that is, when the phase rotation occurs, the phase rotation distinguishing circuit 5 will generate a signal to actuate the alarm signalling circuit 5'.

The principle of the present invention shall be explained more particularly with reference to FIG. 2.

In FIG. 2, the same components as those in FIG. 1 are indicated respectively by the same references 1–5', and references 6 and 7 indicate respective amplifiers, a stationary object such as a fixed room wall or a stationarily displayed article in museums or the like shall be represented by a reference F, a moving object such as a tresspasser into the watching space shall be represented by a reference M, an arrow A indicates a reflected ultrasonic wave from the stationary object F and an arrow B indicates a reflected wave from the moving object M.

Now, in case the moving object M is not present, the reflected wave will be only of the stationary object as shown by the arrow A in FIG. 2. Even in case many stationary objects are present in the space, the reflected waves from these objects will be of the same frequency as the transmitted wave frequency and will be able to be finally represented as a vector sum. Further, as the frequency is constant, these reflected waves from all stationary objects shall be represented by the reflected wave A, including a directly transmitted wave from the transmitter 2 to the receiver 3. On the other hand, if the moving object M to be detected is present, the ultrasonic wave B reflected from the moving object M will be added to the reflected ultrasonic wave A and a resultant wave of A and B will enter the receiver 3.

At this time, as described above, the reflected wave A from the stationary object F will be the same in the frequency as the output of the oscillator 1, but will be different only in the phase and amplitude and the difference in the phase with respect to that of the transmitted signal remains to be of a fixed value.

On the other hand, the reflected wave B from the moving object M is subjected to a Doppler shift with its movement and is, therefore, different also in the frequency from the output signal of the oscillator. That is, when the moving object M moves in the direction of approaching the transmitter 2 and receiver 3, the frequency of its reflected wave B will become higher than the oscillated frequency $f_o$ of the oscillator but, when the moving object moves away, the frequency will become lower. Therefore, when the moving object M is present, there will be a resultant wave of the reflected wave A which is the same in the frequency as the oscillator output but is different by a fixed value in the phase and the reflected wave B from the moving object whose frequency has shifted to be above or below the oscillated frequency.

This manner is represented in the vector diagram of FIG. 3, wherein $\overline{OF}$ is a reference signal, $\overline{OA}$ is a "stationary" reflected wave (a resultant wave of the reflected wave A from the stationary object and the directly transmitted wave from the transmitter to the receiver). $\overline{AB}$ is a reflected wave from the moving object, $\overline{OB}$ is a received signal and $\overline{OB} = \overline{OA} + \overline{AB}$.

In FIG. 3, $\overline{OA}$ is represented by a single vector but is made a vector as a total sum of respective reflected waves even in case a plurality of reflective stationary objects are present.

In FIG. 3, further, $\theta_1$ represents a phase of the received signal with respect to the phase of the reference signal. The phase difference detecting circuit 4 in FIG. 2 generates an output of this phase $\theta_1$.

When the moving object M moves in the direction of approaching the transmitter 2 and receiver 3, the vector $\overline{OA}$ in FIG. 3 will be constant but the vector $\overline{AB}$ will rotate counterclockwise in proportion to the velocity of the moving object because of the Doppler shift caused by the approaching movement of the object M and will continue to rotate in the same direction so long as the object M continues to approach.

When the moving object M separates, the vector $\overline{AB}$ will rotate clockwise.

When the vector $\overline{AB}$ rotates, the resultant vector $\overline{OB}$ will also rotate in the same direction as of the rotation of $\overline{AB}$ and therefore the phase difference detecting circuit 4 will generate an output corresponding to the phase variation of the vector $\overline{OB}$.

Figure 5A:
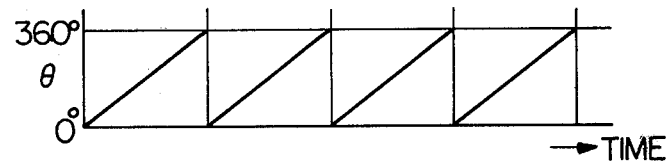
Figure 5B:
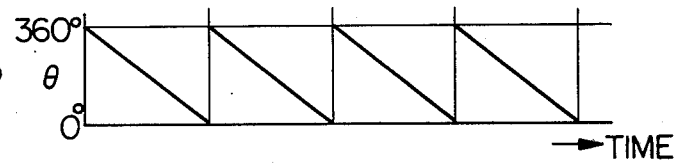
Figure 5C:
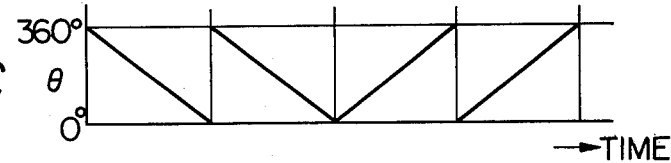

Now, if the output of the phase difference detecting circuit 4 is of a voltage $V_o$ proportional to the phase difference $\theta$ as shown in FIG. 4 and the output voltage is so made as to return to the origin whenever $\theta$ exceeds 360° (the same output with respect to 360° + $\Delta\theta$° and $\Delta\theta$), the outputs of the phase rotation shown in FIG. 3 will be as shown respectively in FIGS. 5A to 5C.

Practically, the output variations shown in FIGS. 5A to 5C should be distorted depending on the sizes of the vectors $\overline{OA}$ and $\overline{OB}$ and are not always straight lines, but it should be understood that they have been represented schematically.

One cycle of respective sawtooth waves shown in these drawings corresponds to one rotation of the vector $\overline{OB}$, and FIG. 5A is of the case when the moving object M approaches and FIG. 5B is when it separates. As the direction of the rotation of the vector $\overline{OB}$ is different between the case when the moving object M separates the receiver and the case when it approaches the receiver, the direction of the phase variation will be reversed. Further, when the moving object M reciprocally moves, the direction of the phase rotation will be reversed at the point when the moving direction is turned as shown in FIG. 5C.

Figure 5D:
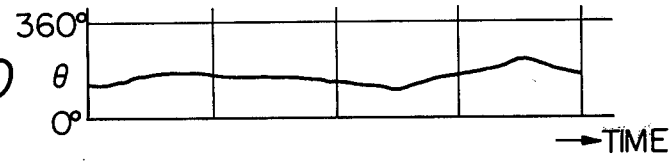

Any variation in the phase when wind blows is shown in FIG. 5D and such phase variation is normally so slight that there is no such regularity in the variation at all as in the cases of FIGS. 5A to 5C.

Further, the behavior of the ultrasonic wave with respect to the movement of wind corresponds, in the sense of the vectors, to the case where no reflected wave corresponding to that B in FIG. 2 is present but only the reflected wave A is present and also to the case where, as explained by FIG. 3, only the vector $\overline{OA}$ is present and the vector $\overline{AB}$ is not present.

Referring to a case in which a foreign noise arrives, the vector $\overline{AB}$ in FIG. 3 will correspond to the foreign noise. However, as this foreign ultrasonic wave varies independently of the emitted ultrasonic wave component, after all, it will not be accompanied with the continuous phase variation and will not come to appear in the output of the phase difference detecting circuit 4.

Figure 5E:
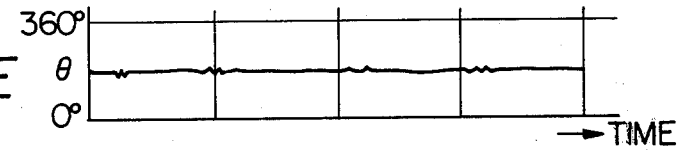

The responses of the phase difference detecting circuit 4 to a wind and foreign noise are as shown in FIGS. 5D and 5E.

The arrangement of FIG. 1 can be achieved by using this principle. That is, in FIG. 1, the respective outputs of the receiver 3 and oscillator 1 are presented to the phase difference detecting circuit 4 so that, only when the phase rotation continuously occurs in one direction, the phase rotation distinguishing circuit 5 will be operated and thereby the alarm signalling circuit 5' will be operated to issue an alarm.

Figure 6:
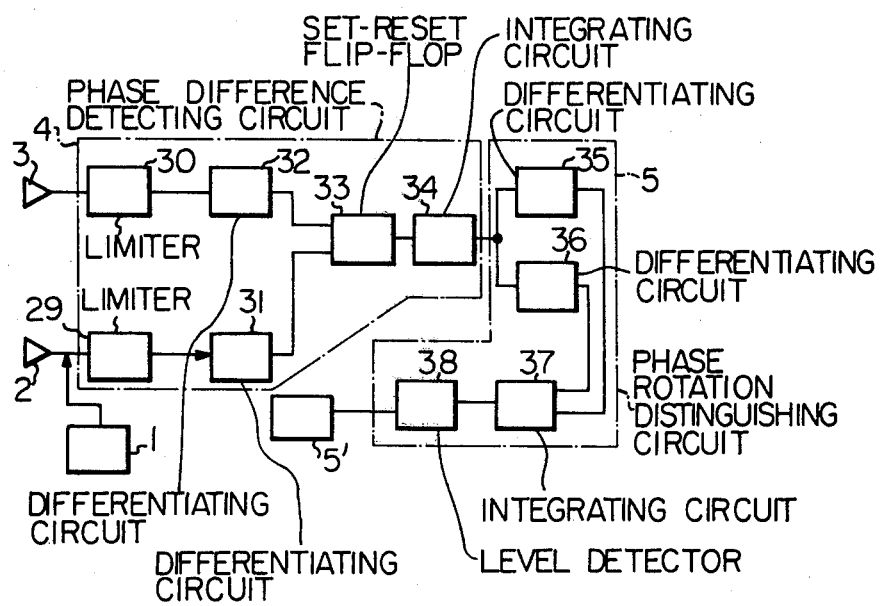
FIG. 6 is a block diagram showing another embodiment of the present invention.

A practical embodiment of the phase difference detecting circuit of the present invention, as well as the phase rotation distinguishing circuit 5, is shown in FIG. 6.

A part of the signal from the oscillator 1 is made a rectangular wave by a limiter 29 and the output of the receiver 3 is also made a rectangular wave by a limiter 30. The outputs of the limiters 29 and 30 are differentiated respectively by differentiating circuits 31 and 32, a set-reset flip-flop 33 is triggered by the rising parts of these differentiated outputs and the output of said flip-flop 33 is integrated by an integrating circuit 34.

The phase difference detecting circuit 4 is formed of these components 29, 30, 31, 32, 33 and 34. Thus, in case there is a phase rotation in the input signal, such sawtooth wave as in FIGS. 5A, 5B or 5C will be obtained. Further, in order to detect the direction of the rotation of the vector, that is, the moving direction of the object M, the output of the integrating circuit 34 is differentiated by the differentiating circuits 35 and 36, a pulse corresponding to the rising part of the sawtooth wave is taken out of one differentiated output and a pulse corresponding to the falling part is taken out of the other. The integrating circuit 37 is operated by the outputs corresponding these positive and negative pulses. When a phase rotating in one direction is present, the output of either of the differentiating circuits 35 and 36 will continue to be generated and, therefore, the integrating circuit 37 integrates such output so that the integrated value will be made a value exceeding a preset upper limit value or below a preset lower limit value so as to distinguish the presence of the phase rotation. The above components 35–38 are forming the phase rotation distinguishing circuit 5.

In the case where a wind or noise is present, even a sawtooth wave will not be generated and therefore the integrating circuit 37 will not operate.

The presetting of the upper limit and lower limit of the output of the integrating circuit is performed by a level detector 38, which produces an output when the output of the integrating circuit 37 exceeds a fixed level, so that an alarm will be issued in the alarm signalling circuit 5'.

Time charts of signals generated by the respective parts in the device of FIG. 6 when a moving object is present and approaches the transmitter and receiver are shown in FIGS. 7A through 7J and those of signals when the moving object separates are shown in FIGS. 8A through 8J, in which FIGS. 7A and 8A show a reference signal which is an output of the limiter 29 in FIG. 6, FIGS. 7B and 8B show a received signal which is an output of the limiter 30, FIGS. 7C and 8C shown an output of the differentiating circuit 31, FIGS. 7D and 8D show an output of the differentiating circuit 32, FIGS. 7E and 8E show an ouput of the set-reset flip-flop 33, FIGS. 7F and 8F show an output of the integrating circuit 34, FIGS. 7G and 8G show an output of the differentiating circuit 35 detecting the rising part of the output of the integrating circuit 34, FIGS. 7H and 8H show an output of the differentiating circuit 36 detecting the falling part of the same. FIGS. 7I and 8I shown an output of the integrating circuit 37, and FIGS. 7J and 8J shown an output of the level detector 38, respectively.

The device according to the present invention performs, as already described, stable operation even in the presences of any foreign turbulent noise and wind. However, the device can be made more practical by a further provision of a correction circuit which is capable of adjusting mutual relations in the phase and magnitude between the reference signal and the received wave signal.

A consideration shall be made here with reference to the case where the "stationary" reflected component $\overline{OA}$ is present closely adjacent the reference phase $\overline{CF}$ in FIG. 3.

Figure 9A:
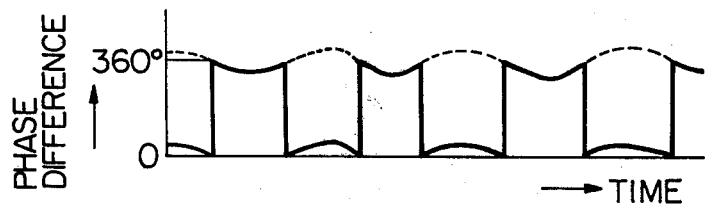
FIGS. 9A and 9B are diagrams for explaining a jumping phenomenon in output signal of a phase difference detecting circuit in the respective embodiments of the invention caused by a slight variation in reflected and received wave from a stationary or fixed object.
Figure 9B:
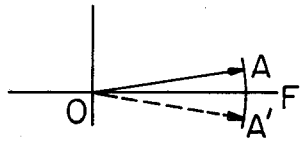

The watching device of the present invention is comparatively little influenced by the foreign noise and wind. However, as shown also in FIGS. 5D and 5E, the stationary phase component $\overline{OA}$ is accompanied with a slight fluctuation even in the device of the present invention. Therefore, when the component $\overline{OA}$ is near zero or 360°, a jumping phenomenon will be produced in the output of the phase difference detecting circuit 4 even if there is the slightest fluctuation in the stationary reflected component. This is a defect produced by the fact that the detecting circuit 4 indicates the phase difference of zero to 360° as made to correspond to the voltage variation of zero to $V_o$ volts as shown in FIG. 4. This state is shown in FIGS. 9A and 9B, in which FIG. 9B shows the vector $\overline{OA}$ or $\overline{OA'}$ slightly fluctuating near zero or 360° in the phase with the reference wave $\overline{OF}$, and FIG. 9A shows the jump in the phase difference detecting output, with the ordinate representing the phase difference and the abscissa representing the time. If such jumping phenomenon is frequently produced, though the phase variation is practically slight, a fluctuation as if it were quick will appear, and this is not desirable.

Figure 10:
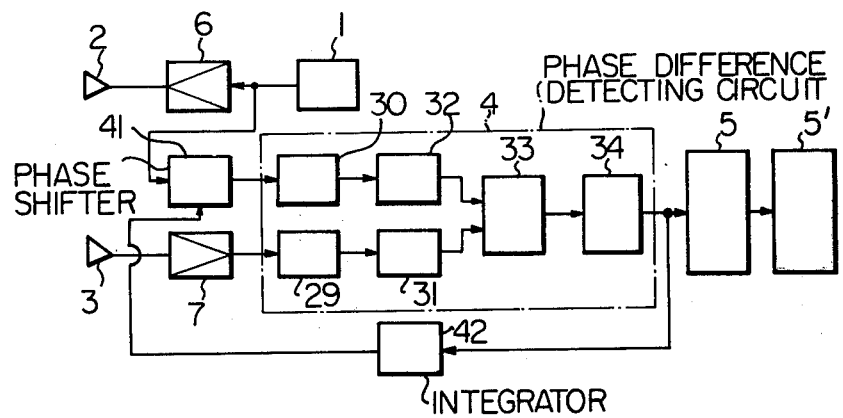
FIG. 10 is a block diagram of another embodiment of the present invention.

In FIG. 10, there is shown another embodiment suggested to prevent the jumping phenomenon by the provision of the correction circuit for regulating the mutual relation in the phase between the reference signal and the received wave signal. In the drawing, a phase shifter 41 is inserted between the oscillating circuit 1 and the phase difference detecting circuit 4 which is formed in the same manner as in FIG. 6, so as to be controlled by the output of the phase difference detecting circuit 4 through a delay circuit (integrator 42) having a time constant. Similar phase rotation distinguishing circuit 5, alarm signalling circuit 5' and amplifiers 6 and 7 to those in FIG. 6 are provided.

Figure 11:
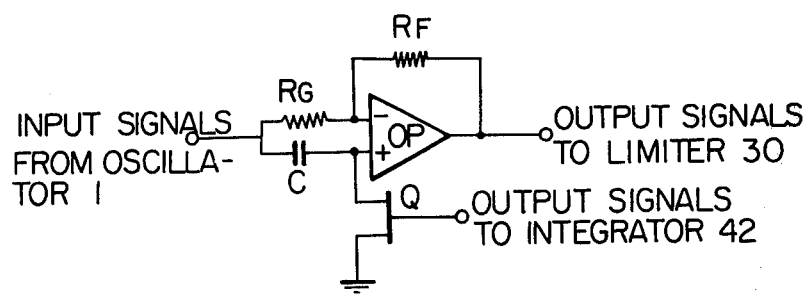
FIG. 11 is a circuit diagram showing an example of a phase shifter employed in the embodiment of FIG. 10.

This phase shifter 41 is to thus shift the output of the oscillator 1 by a fixed phase and is formed, for example, as in FIG. 11. The signal from the oscillator 1 is given to the turned input terminal of an operation amplifier OP through a resistance $R_G$ and to the unturned input terminal through a condenser C. Further, the unturned input terminal is connected to a variable resistance element Q such as, for example, the drain of a field-effect transistor. An integrating circuit 42 is inserted between the circuit 5 and the shifter 41, and its output is given to the gate of the transistor. Further, a resistance $R_F$ is connected between the turned input terminal and output terminal of the operation amplifier OP and the output of this amplifier OP is given to the limiter 30. The field-effect transistor is to vary the equivalent resistance value between the terminals (between the source and drain) with the controlling input signal voltage and to thereby vary the phase between the input and output. When the phase shift is insufficient with this formation, the phase shifter 41 may comprise a plurality of the formations connected in several steps.

Thus, if the phase shift by the phase shifter 41 is so set that the phase difference will be, for example, 180 degrees and is to be controlled by the output of the phase difference detecting circuit 4, the jumping phenomenon can be eliminated when the fluctuation is made to be able to be compensated by the phase shifter even if the received input somewhat fluctuates. That is, the phase shifter as above functions as the correction circuit which is capable of adjusting the mutual phase relation between the reference signal and the received signal.

The detecting limit capacity in the case of the basic circuit of FIG. 1 shall be considered in the following. Referring to FIG. 3, when the vectors $\overline{AB} > \overline{OA}$, the output will be as in FIGS. 5A, 5B or 5C. However, in case the vectors $\overline{AB} < \overline{OA}$, the vector diagram will be as shown in FIG. 12A.

Figure 12A:
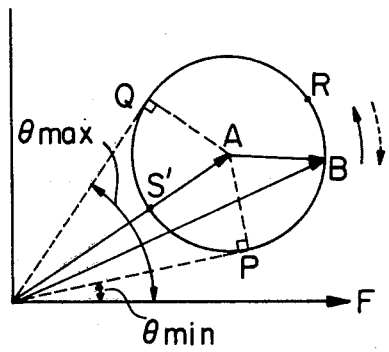
FIGS. 12A through 12C are respectively a vector diagram of reflected waves from stationary and moving objects which are relatively remote from the watching device, and output signal's wave form diagrams of the phase difference detecting circuit in the respective embodiments in the case of FIG. 12A and when the moving object approaches and moves away from the device, respectively.
Figure 12B:
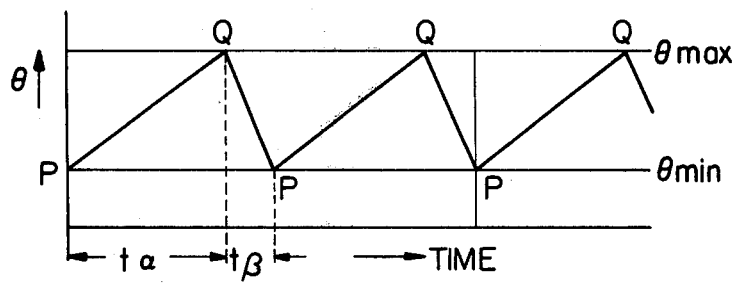
Figure 12C:
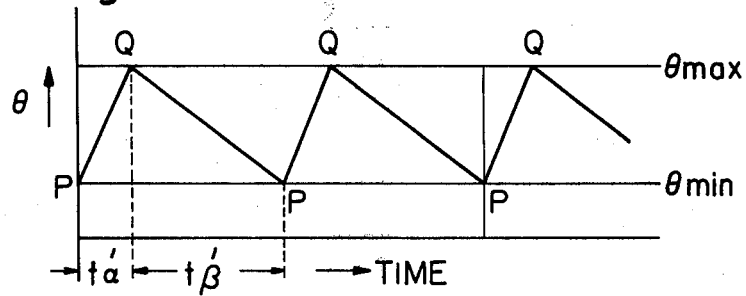

That is, when the stationary reflected wave $\overline{OA}$ becomes stronger than the reflected wave $\overline{AB}$ of the moving object, the output of the phase difference detecting circuit 4 will vary in the fixed amplitude but will not make such characteristic variations as the approach and separation as shown in FIGS. 12B and 12C (FIG. 12B is of the case when the moving object approaches where $\overline{AB}$ will become a counterclockwise rotation in FIG. 12A, while FIG. 12C is of the case when the moving object separates where $\overline{AB}$ will become a clockwise rotation in FIG. 12A and no definite difference as a rotation will appear.

In other words, the outputs corresponding to $\theta_{max}$ and $\theta_{min}$ on the vector will only appear as $V_{max}$ and $V_{min}$ in FIG. 12B (a counterclockwise rotation when the moving object approaches) or FIG. 12C (a clockwise rotation when the moving object separates). Therefore, the moving direction will also become unclear and the moving distance will become hard to detect. Thus, in case the vector $\overline{AB}$ is small, that is, for example, when the moving object is at a distance or in the case of an object low in the reflection rate, the detecting capacity will reduce.

Figure 13:
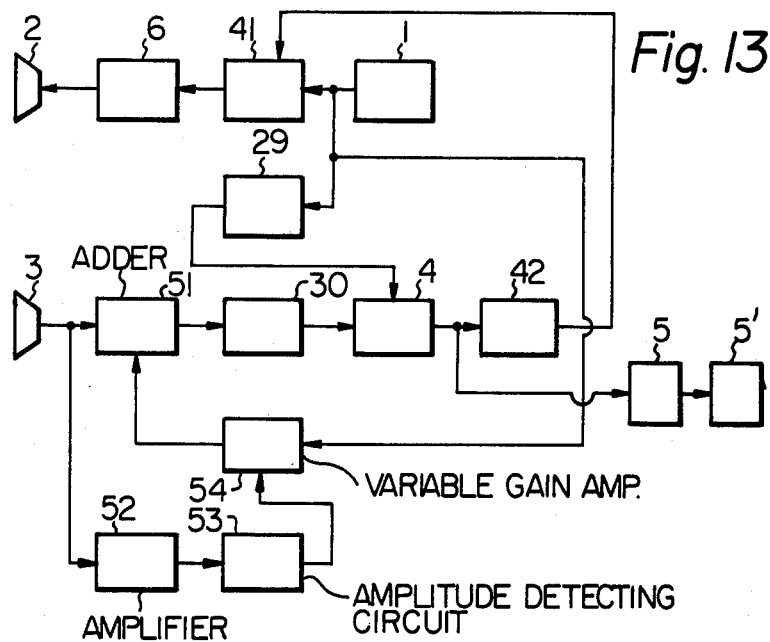
FIG. 13 is a block diagram showing a further embodiment of the present invention specifically showing improved detecting capacity for lower reflections.

In order to prevent this defect and to improve the capacity with a provision of the correction circuit for adjusting, in addition to the phase relation, also the mutual relation in the magnitude between the reference signal and the received signal, a further embodiment of FIG. 13 is suggested.

In FIG. 13, the output from the oscillator 1 is given to the transmitter 2 through the phase shifter 41 and amplifier 6. The input from the receiver 3 is applied to an amplifying circuit 52 and amplitude detecting circuit 53, the output of the latter of which is given to a variable gain amplifier 54. Further, a part of the output from the oscillator 1 is given to the variable gain amplifier 54, the output of which is given to an adder 51, the output from which adder 51 is given to the limiter 29, and the output from the limiter 29 is given to the phase difference detecting circuit 4. The signal of the oscillator 1 is given to this phase difference detecting circuit 4 through the limiter 30. The integrating circuit 42 is also connected between the circuit 4 and the phase shifter 41.

Figure 14:
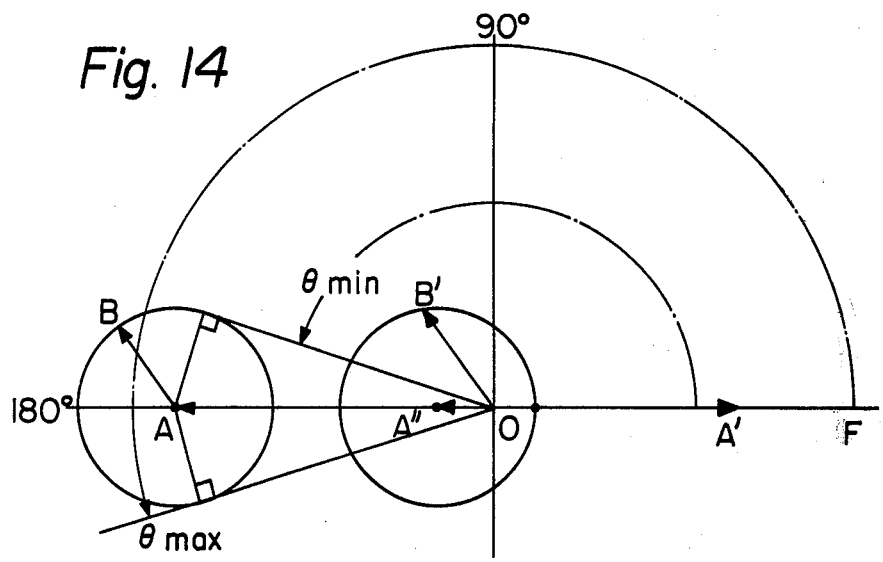
FIG. 14 is a vector diagram for explaining operations of the embodiment of FIG. 13.

The operation of the device as in FIG. 13 shall be explained by using FIG. 14, in which the vector $\overline{OA}$ is a reflected component from a stationary object, and the phase shifter 41 and integrating circuit 42 operate so that the vector $\overline{OA}$ will keep a phase difference of 180° from the reference phase $\overline{OF}$. Further, the vector $\overline{AB}$ is a reflected component by a moving object and is a vector rotating with the point A as a center at an angular velocity $\gamma$ proportional to the velocity of the moving object.

Further, $\overline{OB}$ is a vector sum of $\overline{OA}$ and $\overline{AB}$. The received signal when the moving object is present will be this vector $\overline{OB}$.

The phase difference detecting circuit 4 detects the phase difference of $\overline{OB}$ from $\overline{OF}$ on the basis of the vector $\overline{OF}$.

Now, in case $|AB| < |OA|$ and $\overline{AB}$ rotates with A as a center, as shown in FIG. 14, the phase will vary only between $\theta_{max}$ and $\theta_{min}$. This has been already shown in FIG. 12. As described above, with such output, the phase difference will not vary by 360°, the moving direction and moving distance of the moving object will be hard to detect and will be unclear and the detecting sensitivity will reduce.

In order to eliminate this defect, it is necessary to take measures of nominally reducing the reflected wave from the stationary object.

A vector in which the phase is reverse to that of the stationary reflected vector $\overline{OA}$ and the amplitude is substantially equal to that of $\overline{OA}$ as shown by $\overline{OA'}$ shall be considered.

If this vector $\overline{OA'}$ is added to $\overline{OA}$, a new vector $\overline{OA''}$ will be made, whereby the stationary reflected vector $\overline{OA}$ will be nominally reduced to $\overline{OA''}$. However, it is necessary that here $|OA| - |OA'| = |OA''|$ and $|OA| > |OA'|$, because, if $|OA| < |OA'|$, the output of the adder will be of the same phase as of a correction signal vector OF, the output of the phase difference detecting circuit 4 will be of the value of the phase difference of zero and, as a result, $\overline{OA'}$ will be no longer able to be made in the circuit.

Even in case the moving object comes and moves in the watching space, the shifted component $\overline{AB}$ by the moving object M will be different in the frequency and will not be influenced and, when $OA \rightarrow OA''$, $AB \rightarrow A''B'$ and, if $OA''$ can be reduced here until $OA'' < A''B'$, the vector OB' will rotate the reference wave OF at an amplitude of 360°.

In actually performing this process, as the amplitude of the stationary reflected wave is different depending on the conditions of installing the transmitter and receiver, the arrangement of the stationary object or objects and the acoustic property of such object, it is necessary to also vary $\overline{OA'}$ in responce to the magnitude $\overline{OA}$ of the reflected wave.

On the other hand, the reflected wave $\overline{AB}$ of the moving object generally decreases with the increase of the distance of the moving object from the transmitter and receiver. Therefore, the magnitude $OA'$ must be controlled so that the vector $|OA'|$ will be less than the vector $|AB|$ corresponding to the reflected level of the moving object from the position separated by the distance to be detected.

The process of producing $\overline{OA'}$ shall be explained with reference to FIG. 13 in the following. The output of the oscillator 1 drives the transmitter 2 through the amplifier 6 to emit an ultrasonic wave. The reflected wave is detected by the receiver 3 and is converted to an electric signal which is divided into two systems.

One signal is amplified by the amplifier 52 to convert the amplitude and then a direct current signal proportional to the amplitude is obtained by the amplitude detecting circuit 53 and is applied to the variable gain amplifier 54.

The time constant of the response of the amplitude detecting circuit 53 is made so large as not to respond to any quick variation of the amplitude caused by the moving object.

A part of the output of the oscillator 1 is separately taken out and is put into the phase shifter 41. The output of the phase difference detecting circuit 4 is used through the integrating circuit 42 as a signal controlling the phase shifter 41. Thus, the phase of the signal to be used as a reference is made different by 180° with respect to the received signal.

Then this reference signal is controlled by the variable gain amplifier 54 depending on the output of the amplitude detecting circuit 53 responsive to the before described received signal, so as to obtain such signal as is substantially equal in the amplitude to the received signal and reversed in the phase to the received signal. This is the above described $\overline{OA'}$. This signal and the received signal are added together by the adder 51, in which the received signal $\overline{OB}$ and the previously made signal $\overline{OA'}$ are added together to obtain $OA'' + A''B' = OB'$.

As in the above, only the stationary reflected wave component will be canceled and the reflected wave by the moving object will become relatively large. Therefore, as explained above, the phase variation with the movement of the object to be detected will become larger, even the object moving at a distance will be able to be detected and the detecting capacity will improve.

That is to say, the phase shifter 41, amplitude detecting circuit 53, variable gain amplifier 54 and adder 51 are functioning as the correction circuit which is capable of regulating the mutual phase and magnitude relations between the reference signal and the received signal.

As already explained with reference to FIG. 10, the jumping phenomenon will occur when the phase difference detecting output is near zero or 360°, which is not desirable. Also, in removing the stationary reflected wave component, the reverse phase component of the reference wave is required.

Figure 15:
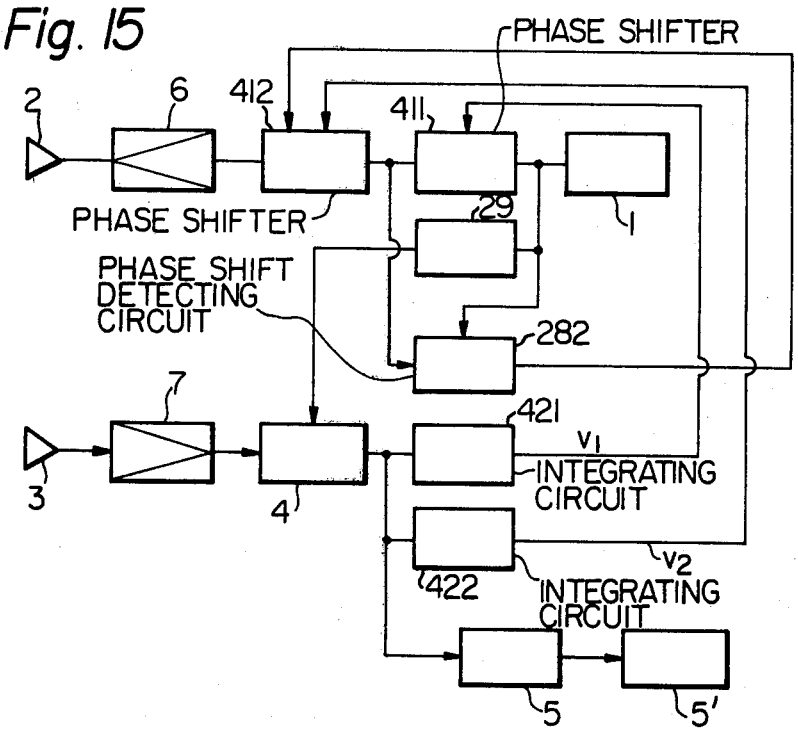
FIG. 15 is a block diagram of another embodiment of the present invention also for the lower reflections.

Another embodiment which is more practical in keeping this reversed phase relation stable is suggested in FIG. 15, in which the oscillator 1, transmitter 2, receiver 3, phase difference detecting circuit 4, limiter 29 and amplifiers 6 and 7 are of the same functions as those of the same reference numerals in the foregoing embodiments.

Figure 16A:
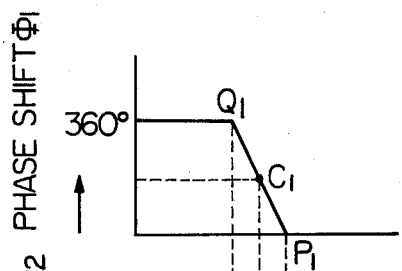
FIGS. 16A through 16E are diagrams for explaining operations of the embodiment of FIG. 15.
Figure 16B:
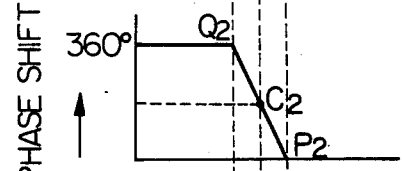

Reference numerals 411 and 412 represent phase shifters inserted between the oscillator 1 and the amplifier 7 and respectively having a phase shifting capacity of 360° so as to be able to produce phase shifts $\Phi_1$ and $\Phi_2$ with an external control voltage as shown in FIGS. 16A and 16B.

Reference numeral 282 represents a phase shift detecting circuit, which is so formed that the phase shift $\Phi_1$ of the phase shifter 411 will be detected and that, when it is detected that the phase shift has reached outside the range of a preset phase shift, the phase shifter 412 will be controlled to control the entire phase shift and such signal as will control the output of the phase difference detecting circuit 4 for generating a voltage always corresponding to the phase of 180° will be generated.

Figure 16C:
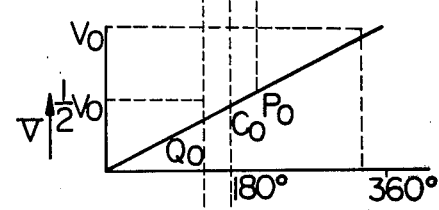
Figure 16D:
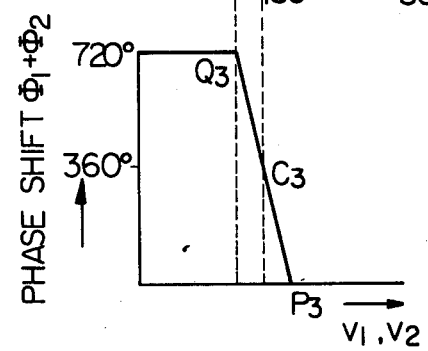
Figure 16E:
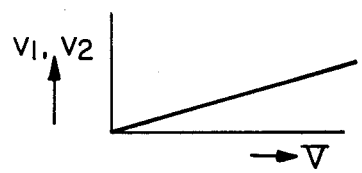

Reference numerals 421 and 422 represent integrating circuits respectively having a time constant and having such characteristics as are shown in FIG. 16E (wherein the abscissa represents the output voltage of the phase difference detecting circuit 4 and the ordinate represents the outputs of integrating circuits 421 and 422) so that the output signals of the phase difference detecting circuit 4 will be fed back to the phase shifters 411 and 412 at a fixed level ratio to control the phase shifts $\Phi_1$ and $\Phi_2$ of the phase shifters 411 and 412 and, in case there is no moving object, the phase difference output of the phase difference detecting circuit 4 will be maintained at a voltage corresponding to 180°.

Further, the phase rotation distinguishing circuit 5 and alarm signalling circuit 5' are provided so as to operate the latter circuit 5' in response to the output of the phase difference detecting circuit 4 when a moving object is present.

The characteristics of the phase difference detecting circuit 4 are already shown in FIG. 4.

Now, the output of the phase difference detecting circuit 4 is assumed to correspond to 180°. When the external state varies so that the received signal will be in a slightly advanced phase, the output of the phase difference detecting circuit 4 will tend to increase. If this state is assumed to be the variation of the point $C_o$ to the point $P_o$ in FIG. 16C, the received signal will be applied to the phase shifters 411 and 412 respectively through the integrating circuits 421 and 422 so as to decrease the respective phase shifts. Therefore, the received input signal will generally keep the previous state. On the other hand, when such variation of the external state that will delay the received signal occurs, the output of the phase difference detecting circuit 4 will tend to reduce and, therefore, the phase shifts of the phase shifters 411 and 412 will increase and operate to advance the phase of the output wave signal and to still keep the phase difference between the phase of the received signal and that of the reference signal to be constant.

The larger variation of the external state shall be referred to with reference to FIG. 17 and FIGS. 18A–18D, in which the transmitter 2 and receiver 3 are disposed to perform an integral movement.

Now, if the transmitter 2 and receiver 3 are of the phase shift $\Phi_1 = 180°$ (point $C_1$ in FIG. 18B), $\Phi_2 = 180°$ (point $C_2$ in the FIG. 18C), $\Phi_1 + \Phi_2 = 360°$ (point $C_3$ in FIG. 18D) and of the phase difference detecting output $\theta = 180°$ (the point $C_o$ in FIG. 18A) at a distance $l_o$ from a stationary object F and when the transmitter 2 and receiver 3 are slightly deviated in the direction of approaching the stationary object F, the course length of the emitted ultrasonic wave will decrease, and the phase of the incident wave upon the receiver will advance. If, in this case, the rise of the received signal is taken to be a reference, the phase difference will tend to increase, and the phase shifts $\Phi_1$ and $\Phi_2$ operate to delay the phase of the received signal, that is, to reduce the phase shift, in order to compensate for the phase advance.

Figure 18A:
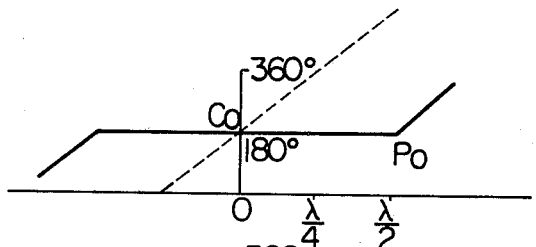

This process shall be further explained with reference to FIGS. 18A–18D. The broken line in FIG. 18A represents the actual variation of the received signal in the course of the emitted wave. When $\theta = 180°$ at the point O, each of the phase shifts $\Phi_1$ and $\Phi_2$ will be 180°, a phase shift of 360° will be generally made and the output of the phase difference detecting circuit 4 will also generate a phase difference corresponding to 180°.

Figure 17:
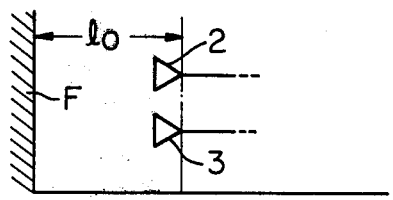
FIGS. 17 and 18A through 18D are respectively an explanatory view and phase shift diagrams in the case of larger variations in external state of the device.

When the transmitter 2 and receiver 3 move to the left in FIG. 17 to approach the stationary object F, the operating points respectively in FIGS. 18A–18D will move rightward, the course length will decrease and the received input signal will tend to advance. This variation will appear in the phase difference detecting circuit 4, so that the phase shifters 411 and 412 will operate to delay the phase of the emitted output signal and, therefore, the general phase will be able to keep the substantially original state.

Figure 18B:
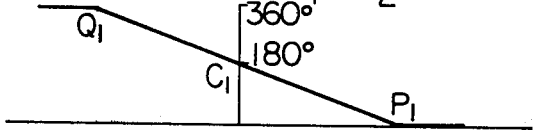
Figure 18C:
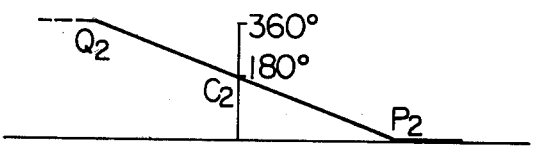
Figure 18D:
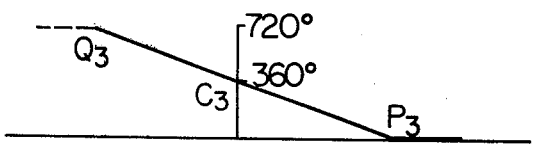

However, as understood from FIG. 18A, when the transmitter 2 and receiver 3 further move to pass the point $P_o$, the phase shifters 411 and 412 will be respectively saturated and the points $P_1$ and $P_2$ as in FIGS. 18B and 18C will be respectively reached so that the phase will be no longer able to be shifted. Therefore, after this state, the phase difference detecting output will be no longer able to maintain 180° and will begin to increase.

In order to solve the above respect, the phase shift detecting circuit 282 detects the phase shift $\Phi_1$ of the phase shifter 411 and, when the phase shift $\Phi_1$ becomes to be over a fixed range, the output will be generated, the signal will be applied to the phase shifter 412 and the phase difference θ will be returned to 180° so as to be able to be controlled.

Figure 19:
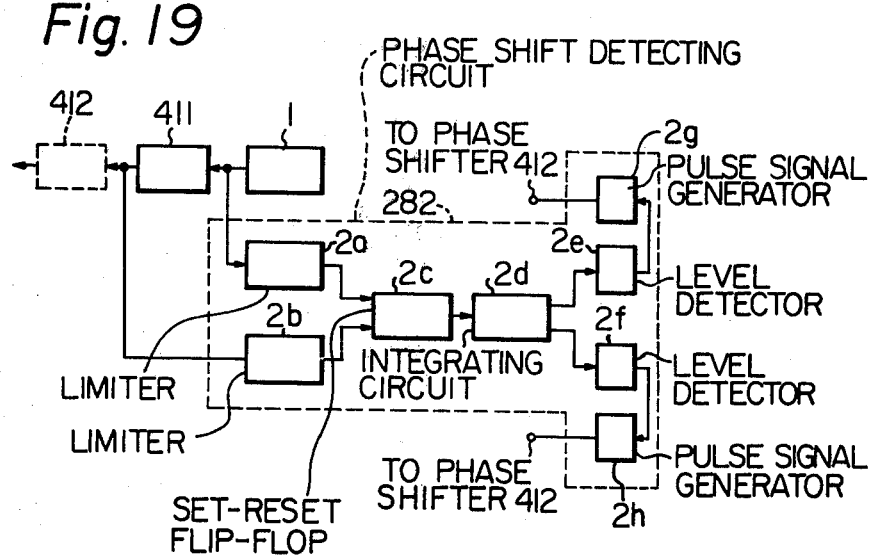
FIG. 19 is a block diagram of an embodiment of the phase difference detecting circuit employed in the embodiment of FIG. 15.
Figure 20A:
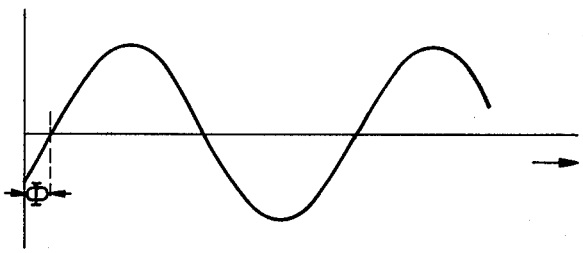
FIGS. 20A through 20C are signal wave form diagrams for explaining operations of the embodiment of FIG. 19.
Figure 20B:
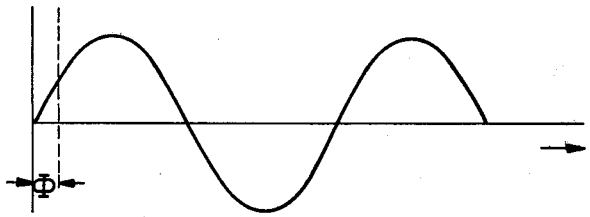
Figure 20C:
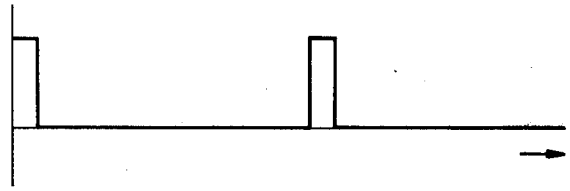
Figure 21:
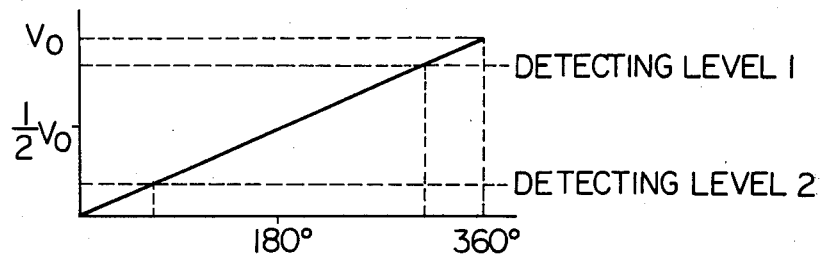
FIG. 21 is a diagram for explaining operations of level detectors in the embodiment of FIG. 19.

Now, the operation of the above phase shift detecting circuit 282 shall be explained with reference to FIG. 19, in which an example of the same is shown. The phase shift detecting circuit 282 converts the input signal of the phase shifter 411 as shown in FIG. 20A to a rectangular wave with a limiter 2a and also converts the output of the phase shifter 411 as shown in FIG. 20B to a rectangular wave with a limiter 2b. Both rectangular waves are applied to a set-reset flip-flop 2c to obtain a rectangular wave proportional to the phase difference between both signals. This rectangular wave is integrated by an integrator 2d in FIG. 19.

The integrated output thus obtained at the integrator 2d is fed to respective level detectors 2e and 2f which are so set as to detect the phase shift near zero or 360°. If the integrated output is an output corresponding near to zero or 360°, the detected signal will be provided to a pulse signal generator 2g or 2h and a locking signal will be generated by this pulse signal generator 2g or 2h.

Figure 22A:
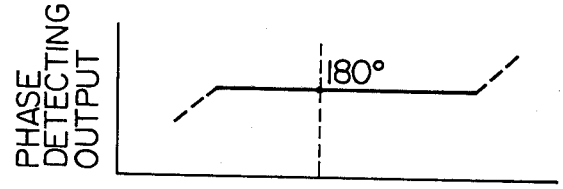
FIGS. 22A through 22D are diagrams showing phase shift variations for further explaining the operations of the embodiment of FIG. 19.
Figure 22B:
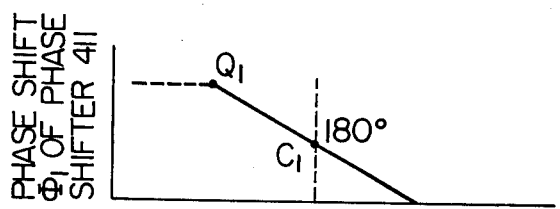
Figure 22C:
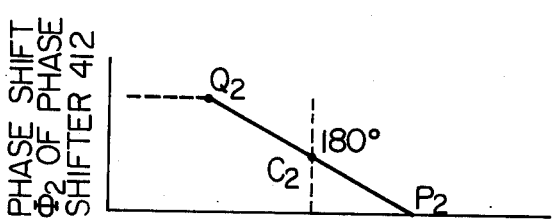
Figure 22D:
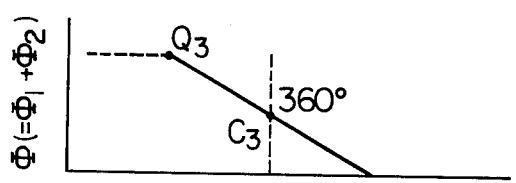

As shown in FIG. 22, the locking pulse signal from the pulse signal generator 2h moves the total phase shift $\Phi$ ($= \Phi_1 + \Phi_2$) of the phase shifter from the point $P_3$ to the point $C_3$ in FIG. 22D.

Even if there is this phase shift variation, this variation is 360° and the output of the phase difference detector 4 will not vary. Therefore, even if the transmitter 2 and receiver 3 are further moved, the control of the phase shifter will be possible as ever.

Further, as shown in FIG. 22D, the signal from the pulse signal generator 2g moves the total phase shift $\Phi$ from the point $Q_3$ to the point $C_3$. Therefore, even if the components 2 and 3 are moved the same as in the above, it will be possible to keep the output of the phase difference detector 4 at an output corresponding to 180°. In the drawings, FIG. 22A shows the output of the phase difference detector 4, FIG. 22B shows the phase shift $\Phi_1$ of the shifter 411, FIG. 22C shows the phase shift $\Phi_2$ of the phase shifter 412, FIG. 22D shows $\Phi = \Phi_1 + \Phi_2$ and the abscissa represents the variation of the course length.

As described above, when $\Phi$ is moved from $Q_3$ to $C_3$ or from $P_3$ to $C_3$, the operating point of the phase shift $\Phi_1$ of each phase shifter will be moved from $Q_1$ to $C_1$ or the operating point of the phase shift $\Phi_2$ will be moved from $Q_2$ to $C_2$ to shift the phase from the saturated state to the operating range so that the compensating capacity of the phase shifter will be restored.

The phase locking mechanism shall be explained with reference to an embodiment shown in FIG. 23. As already described, the phase shifters 411 and 412 are respectively so formed as to have a phase shifting capacity of a maximum of 360°. At each of points $A_1$ and $A_2$ in their circuit, a voltage controlling the phase shift is applied to the shifters. With this voltage, the equivalent resistance values of field-effect transistors $FET_1$ to $FET_4$ will vary in response to voltages applied to these transistors $FET_1$ to $FET_4$, the maximum phase shifts of the phase shifters 411 and 412 will be 360° and the phase shift of a maximum of 720° will be obtained by vertically connecting the phase shifters 411 and 412 with each other.

Figure 23:
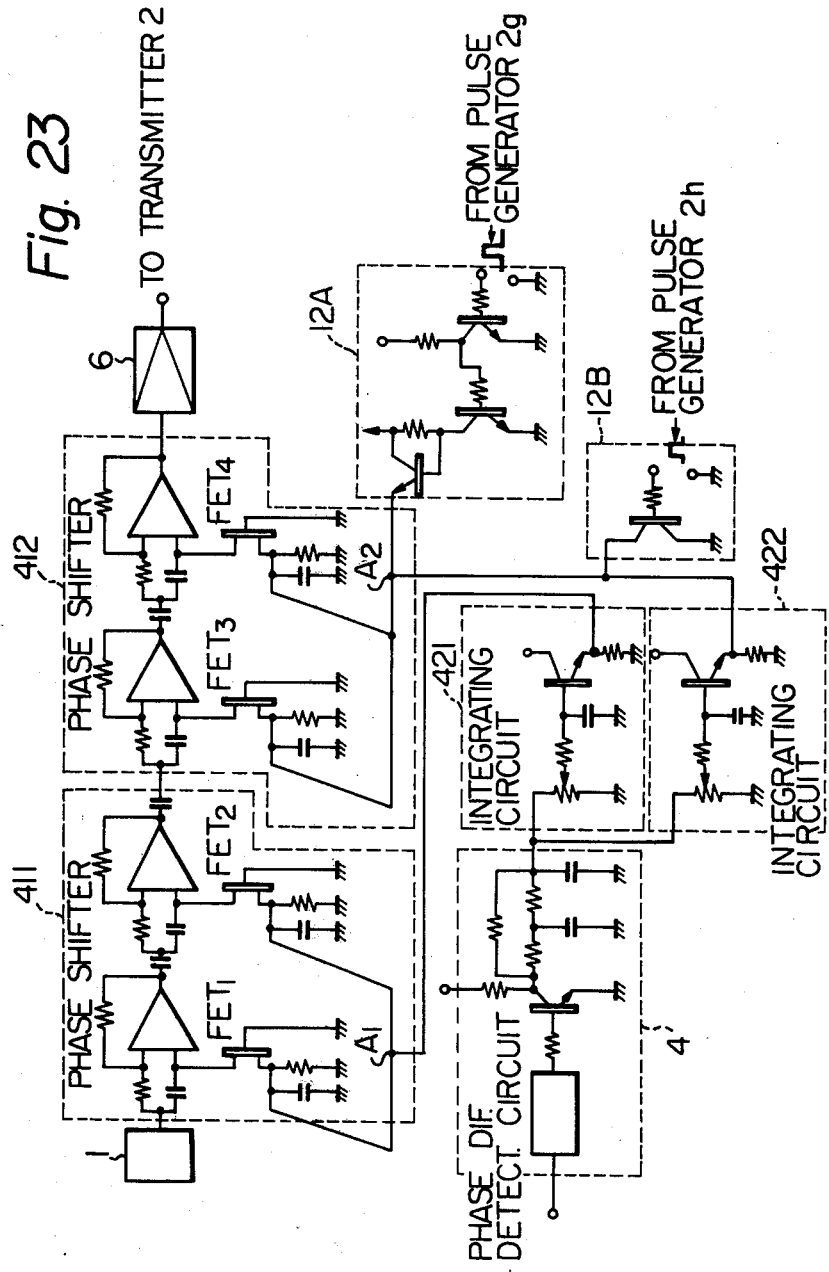
FIG. 23 is a block diagram showing a phase lock mechanism employed in the embodiment of FIG. 15.

In FIG. 23, references 12A and 12B represent controlling circuits for locking the phases and operated by locking signals from the pulse generators 2g and 2h.

When the total phase shift becomes near 720°, that is, the phase shift $\Phi_1$ of the phase shifter 411 approaches 360°, the controlling circuit 12A will be operated by a locking signal generated by the pulse generator 2g to impress a controller voltage at the point $A_2$ so that the phase shift $\Phi_2$ of the phase shifter 411 will be made 0, the total phase shift $\Phi$ will be decreased from 720° to 360° and the phase difference will be finally locked at or returned to 180°.

On the other hand, when the phase shift $\Phi_1$ becomes near zero radian, the controlling circuit 12B will be operated by a locking signal generated by the pulse generator 2h to make the point $A_2$ 0 voltage so that the phase shift $\Phi_2$ of the phase shifter 411 will be increased from 0° to 360° and finally the phase difference will be locked at 180°.

Figure 24:
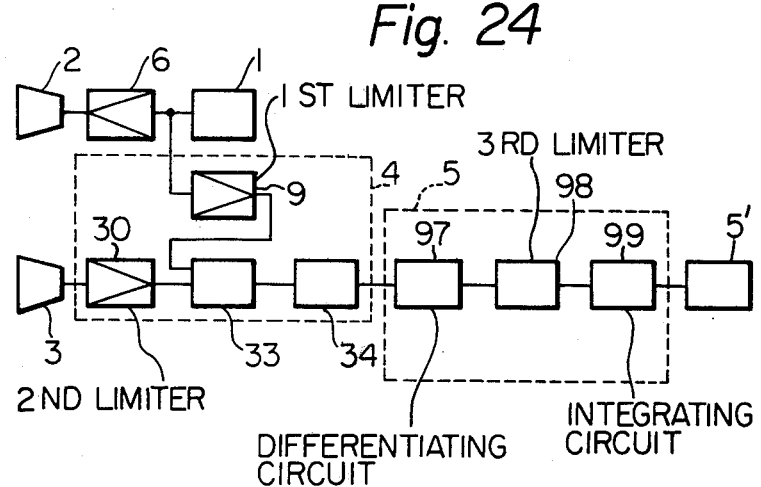
FIG. 24 is a block diagram of still another embodiment of the present invention specifically adapted to detections of the moving object in close and remote positions.

FIG. 24 shows another embodiment of the watching device of the present invention provided with a phase rotation distinguishing circuit which can detect any moving object present even at a long or short distance.

Referring to its circuit arrangement, respective components corresponding to those 1 through 5' in the foregoing embodiments are represented by the same reference numerals. The output from an oscillator 1 is emitted as an ultrasonic wave by a transmitter 2 through an amplifier 6. The phase difference detecting circuit 4 comprises a first limiter 29 and a second limiter 30, and reflected ultrasonic wave received by the receiver 3 is provided to the phase difference detecting circuit 4 through the second limiter 30, while the output of the oscillator 1 is given to the phase difference detecting circuit 4 through the first limiter 29. An output from the phase difference detecting circuit 4 is given to a differentiating circuit 97, an output of which is given to a third limiter 98, and an output of this third limiter is given to an integrating circuit 99, which provides an output to an alarm signalling circuit 5' which operates an alarm device or the like. In the phase difference detecting circuit 4, the outputs of the limiters 29 and 30 are provided to the differentiating circuit 97 through a flip-flop 33 and integrating circuit 34 as in the case of FIG. 6. The differentiating circuit 97, third limiter 98 and integrating circuit 99 are forming the phase rotation distinguishing circuit 5 in the present case.

In case a moving object moves at a fixed velocity, referring to the vector diagram of FIG. 12A, the vector $\overline{AB}$ representing the reflected wave component from the moving object will rotate at a fixed angular velocity with the point A as a center and, following thereto, the vector $\overline{OB}$ representing the received signal will also rotate with the original point 0 as a center so that the phase difference between the reference signal $\overline{OF}$ and the received signal $\overline{OB}$ will become minimum at the point P and maximum at the point Q. Further, the time during which the phase difference continues to increase and the time during which it continues to decrease are, as the arc $\overset{\frown}{PRQ}$ < the arc $\overset{\frown}{QSP}$, to be different depending on the direction of the rotation of the vector $\overline{AB}$. That is, in case the moving object approaches, the vector $\overline{AB}$ will rotate counterclockwise and the time $t\alpha$ during which the phase difference continues to increase will be longer than the time $t\beta$ during which it continues to decrease as in FIG. 12B. In case the moving object separates, on the other hand, the vector AB will rotate clockwise and the time $t'\alpha$ during which the phase difference continues to increase will be shorter than the time $t'\beta$ during which it continues to decrease as in FIG. 12C.

Figure 25A:
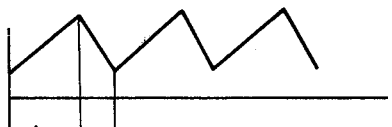
FIGS. 25A through 25D are signal wave form diagrams for explaining operations of the embodiment shown in FIG. 24.
Figure 25B:
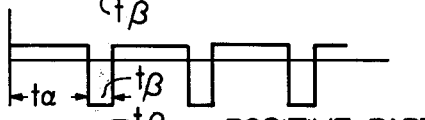
Figure 25C:
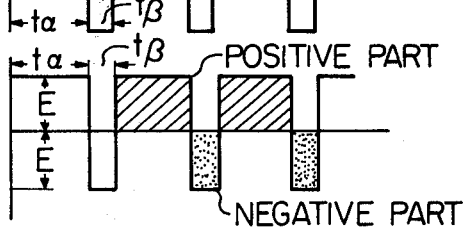
Figure 25D:
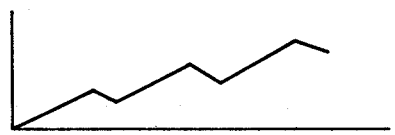

Now, referring to signal wave form diagrams of FIGS. 25A-25D, when the phase difference detecting signal shown in FIG. 25A is differentiated simply by the differentiating circuit 97, a wave form of $t\alpha \neq t\beta$ as in FIG. 25B will be obtained. When this output is sufficiently amplified by the limiter 98 so as to be of a limiter level having the amplitude set at the point 0 as a center, there will be obtained an output in which, as shown in FIG. 25C, both positive and negative levels (the upper part of the abscissa is positive and the lower part is negative) are the same but the time widths are different ($t\alpha \neq t\beta$). When this output signal is integrated by the integrating circuit 99, as the time widths are different, in case the moving object moves in one direction (when it approaches in the case of FIG. 25), an integrated output in a fixed direction (positive or negative) will be obtained. If the arrangement is made so that the alarm signalling circuit 5' will actuate to thereby drive an alarm device (not shown) at the time when the integrated level has become to be above a fixed, value, even the moving object present at a far distance from the transmitter and receiver will be able to be well detected. In case the phase rotates by 360°, $t\alpha = 0$ or $t\beta = 0$ and, therefore, a favorable operation will be performed.

Figure 26A:
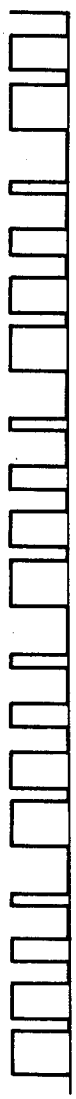
Figure 26B:
Figure 26C:
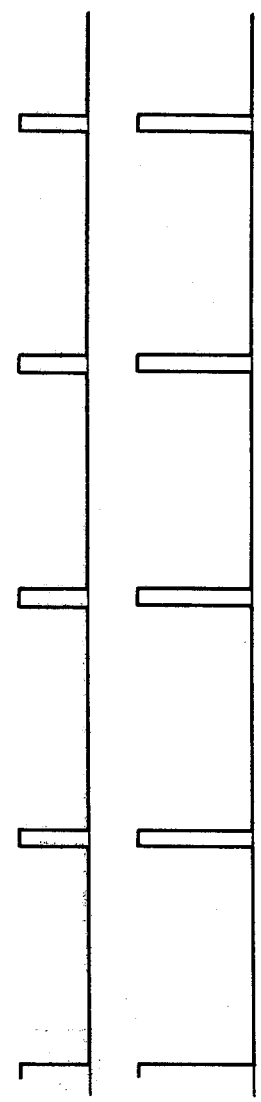
Figure 26D:
Figure 26E:

Output voltage wave form time charts at the respective parts of the device of FIG. 24 are shown in FIGS. 26A-26E for the case where the moving object separates and in FIGS. 27A-27E for the case where the moving object approaches, in which FIGS. 26A and 27A show the output of the flip-flop 33, FIGS. 26B and 27B show the output of the integrating circuit 34, FIGS. 26C and 27C show the output of the differentiating circuit 97, FIGS. 26D and 27D show the output of the limiter 98, and FIGS. 26E and 27E show the output of the integrating circuit 99.

Figure 28A:
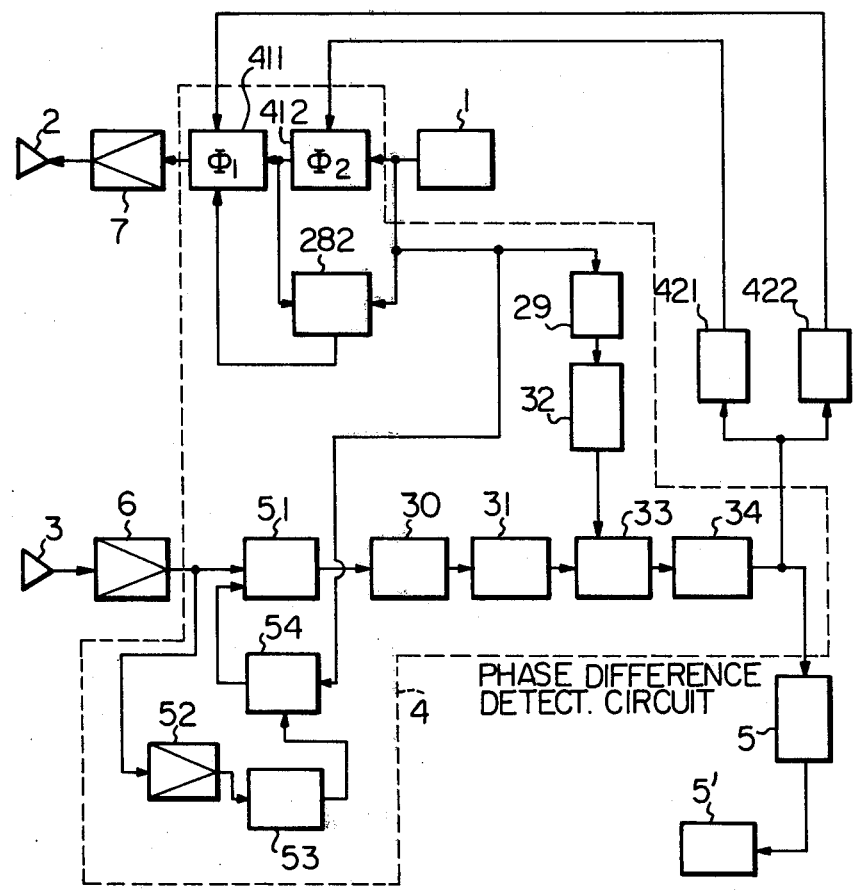
FIGS. 28A through 28C are block diagrams of applied embodiments of the watching device, phase rotation distinguishing circuit and phase shift detecting circuit of the present invention, respectively.
Figure 28B:
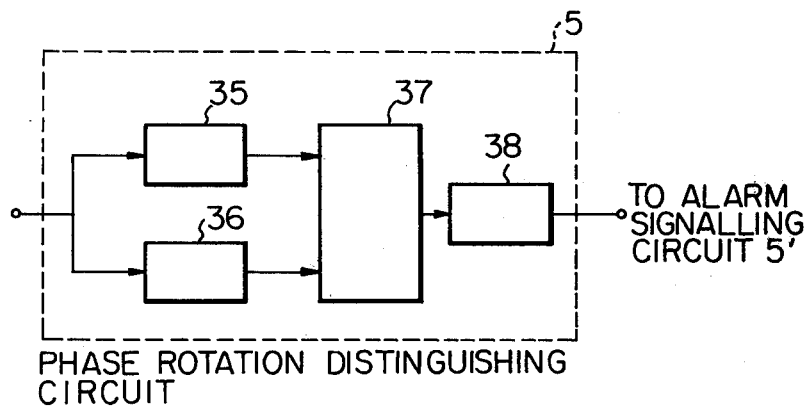
Figure 28C:
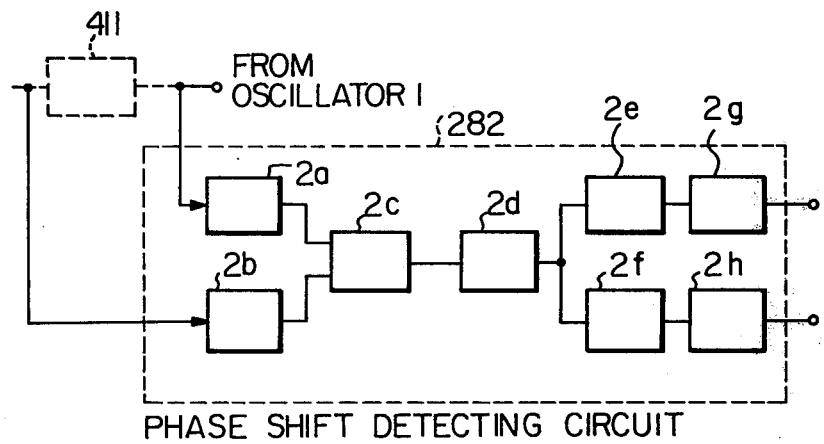

In FIGS. 28A through 28C, there is suggested a totalized embodiment of the watching device according to the present invention, in which the respective features of the foregoing embodiments are combined. In FIG. 28A, the oscillated output from the oscillator 1 is given to the transmitter 2 through the phase shifters 412 and 411 and amplifier 7. The receiver 3 is connected with the alarm signalling circuit 5 through the amplifier 6, adder 51, limiter 29, differentiating circuit 31, set-reset flip-flop 33 and integrating circuit 34. A part of the input from the receiver 3 is amplified and the output from the variable gain amplifying circuit 54 through the amplitude detector 53 is given to the adder 51. Also, a part of the output of the integrating circuit 34 is given to the phase shifters 411 and 412 respectively through the integrating circuits 421 and 422.

Detailed arrangement of the phase rotation dintinguishing circuit 5 is shown in FIG. 28B, which comprises the differentiating circuits 35 and 36, integrating circuit 37 and level detecting circuit 38, and details of the phase shift detecting circuit 282 in the phase difference detecting circuit 4 is shown in FIG. 28C, which comprises the limiters 2a and 2b, set-reset flip-flop 2c, integrating circuit 2d, level detecting circuits 2e and 2f and pulse generators 2g and 2h. Their operations should be understood from the foregoing explanations of the respective embodiments.

What is claimed is:

1. An ultrasonic wave watching device of moving object detecting type comprising an ultrasonic wave transmitter, a high frequency oscillator for exciting said transmitter and providing a reference signal of oscillated high frequency, a receiver for receiving reflected ultrasonic wave transmitted by the transmitter and reflected from an object to generate a received wave signal, means for detecting any difference in phase between said received wave signal from said receiver and said reference signal from the oscillator, means for distinguishing a fixed directional phase rotation of said phase difference detected by said phase difference detecting means, an alarm signalling means responsive to an output from said phase rotation distinguishing means, and a correction means responsive to an output from said phase difference detecting means for adjusting at least one of mutual relations in phase and magnitude between said received wave signal and said reference signal.

2. A device according to claim 1 wherein said correction means comprises a phase shifter for making said phase difference between said reference signal and said received wave signal always to be of a fixed value in response to an output from said phase difference detecting means in the absence of said object moving and to be detected.

3. A device according to claim 2 wherein said fixed value of the phase difference is substantially 180°.

4. A device according to claim 1 wherein said correction means corrects said received wave signal to a signal substantially equal in its amplitude and reverse in its phase to said reference signal.

5. A device according to claim 1 wherein said correction means comprises a phase shifter responsive to an output from said phase difference detecting means for regulating phase difference of said received wave signal from said reference signal so as to render the reference signal and a reflected wave component in the received wave signal to be of a reverse phase to each other, an amplitude detecting circuit for detecting an amplitude of said reflected wave component of the received wave signal, a variable gain amplifier controlled by an output of said amplitude detecting circuit to render the amplitude of the reference signal shifted in phase to be substantially equal to that of the received wave signal, and an adder for adding an output of said variable gain amplifier to the received wave signal to obtain a corrected received-wave signal, so that mutual relation between the reference signal and said corrected received-wave signal will be made substantially equal in the amplitude but reverse in the phase to each other.

* * * * *